United States Patent [19]

De Jaeger et al.

[11] Patent Number: 5,589,048

[45] Date of Patent: Dec. 31, 1996

[54] METHOD FOR THE PRODUCTION OF A RADIOGRAPHIC SCREEN

[75] Inventors: Nikolaas De Jaeger, Hove; Guy Damen, Dessel, both of Belgium; Gerhard Winter, Goslar, Germany; Jan Van Havenbergh, Zwijndrecht, Belgium

[73] Assignee: AGFA-Gevaert, N.V., Mortsel, Belgium

[21] Appl. No.: 197,825

[22] Filed: Feb. 17, 1994

Related U.S. Application Data

[62] Division of Ser. No. 983,708, Dec. 1, 1992, Pat. No. 5,296,117.

[30] Foreign Application Priority Data

Dec. 11, 1991 [EP] European Pat. Off. .............. 91203238

[51] Int. Cl.$^6$ ........................... C25D 13/02; C25D 13/10
[52] U.S. Cl. ........................ 204/489; 204/486; 204/490; 204/497
[58] Field of Search .............................. 204/181.7, 180.2, 204/181.1, 181.4, 181.5, 181.6, 486, 484, 496, 497, 489, 490

[56] References Cited

U.S. PATENT DOCUMENTS 2,851,408  9/1958  Cerulli ................................. 204/181.4
3,743,833  7/1973  Martic et al. .............................. 250/80

Primary Examiner—Bruce F. Bell
Assistant Examiner—John S. Starsiak, Jr.
Attorney, Agent, or Firm—Breiner & Breiner

[57] ABSTRACT

A method for the production of a radiographic screen comprising the following steps:

1) dispersing phosphor particles in an organic liquid in the presence of a charge controlling agent that charges said phosphor particles with a positive or negative net charge, 2) arranging said dispersion between a pair of electrodes, wherein one of said electrodes is or carries a conductive support of said radiographic screen, 3) applying and maintaining between said electrodes a sufficiently high direct current voltage to deposit charged phosphor particles onto said conductive support, and 4) separating said support carrying electrophoretically deposited phosphor particles from said organic liquid, wherein the dispersing of said phosphor particles proceeds by means of an organic surface active compound acting as dispersing agent for said phosphor particles, and said phosphor particles are electrostatically charged through adsorption thereon of ionic components of said organic surface active compound and/or through adsorption of cations or anions stemming from an ionic inorganic compound incorporated in said liquid.

5 Claims, 1 Drawing Sheet

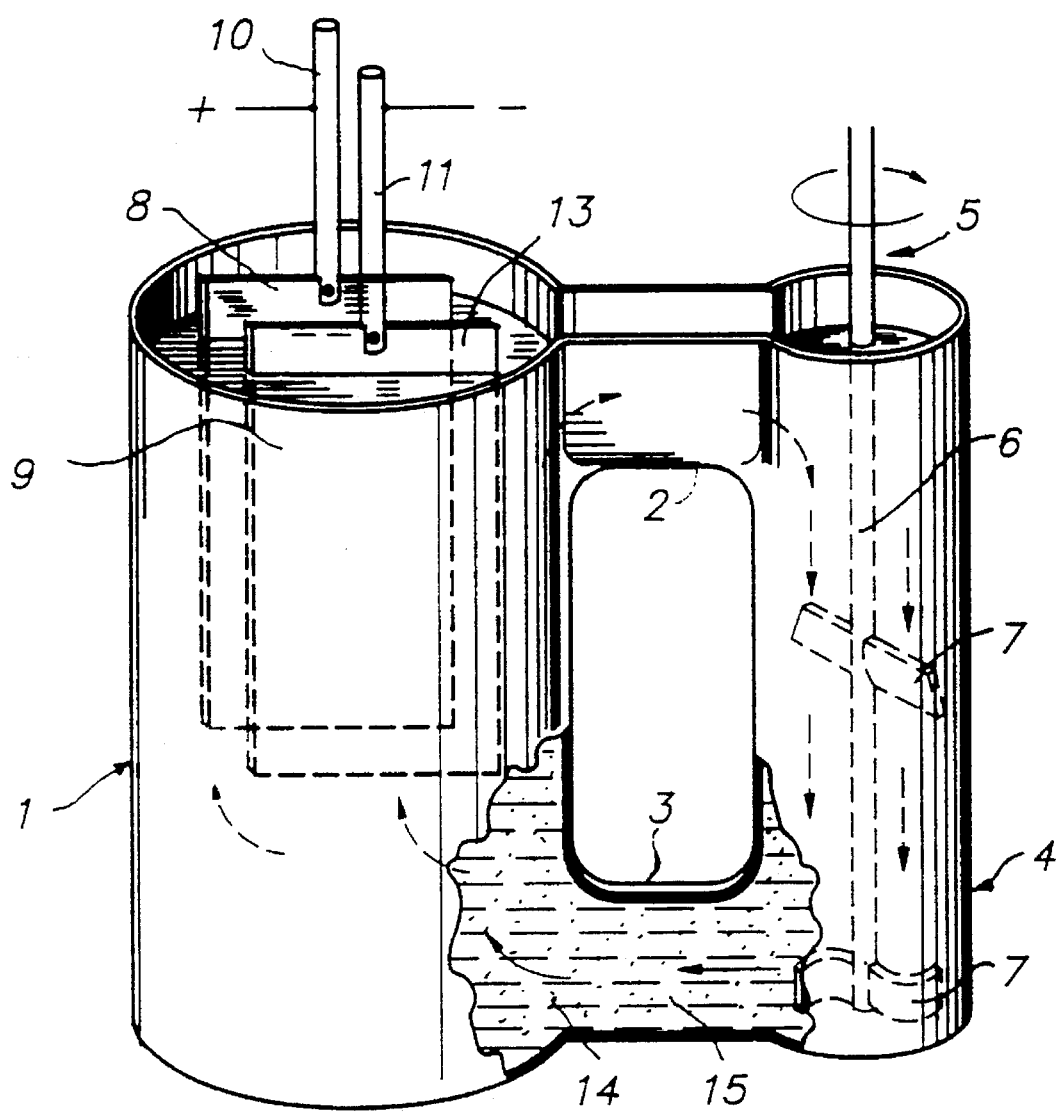

5,589,048

METHOD FOR THE PRODUCTION OF A RADIOGRAPHIC SCREEN

This is a division of application Ser. No. 07/983,708 filed Dec. 1, 1992 now U.S. Pat. No. 5,296,117.

FIELD OF THE INVENTION

The present invention relates to radiography, the use therein of phosphor-containing screens prepared by electrophoretic deposition of phosphor particles and the production of such screens.

BACKGROUND OF THE INVENTION

In radiography the interior of objects is reproduced by means of penetrating radiation, which is high energy radiation also known as ionizing radiation belonging to the class of X-rays, gamma-rays and high-energy elementary particle radiation, e.g. beta-rays, electron beam or neutron radiation. For the conversion of penetrating radiation into visible light and/or ultraviolet radiation luminescent substances, called phosphors, are used.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed to form therein a silver image in conformity with the X-ray image.

More recently as described e.g. in U.S. Pat. No. 3,859,527 an X-ray recording system has been developed wherein photostimulable storage phosphors are used having in addition to their immediate light emission (prompt emission) on X-ray irradiation the property to store temporarily a large part of the X-ray energy. Said energy is set free by photostimulation in the form of fluorescent light different in wavelength from the light used in the photostimulation. In said X-ray recording system the light emitted on photostimulation is detected photoelectronically and transformed into sequential electrical signals.

The basic constituents of such X-ray imaging system operating with a photostimulable storage phosphor are an imaging sensor containing said phosphor in particulate form normally in a plate or panel, which temporarily stores the X-ray energy pattern, a scanning laser beam for photostimulation, a photoelectronic light detector providing analogue signals that are converted subsequently into digital time-series signals, normally a digital image processor which manipulates the image digitally, a signal recorder, e.g. magnetic disk or tape, and an image recorder for modulated light exposure of a photographic film or an electronic signal display unit, e.g. cathode-ray tube.

The terminology "radiographic screen" as used herein refers to screens suitable for use in conventional screen-film combinations or for use in stimulated luminescence radiography.

From the preceding description of said two X-ray recording systems operating with radiographic screens in the form of a sheet, plate or panel it is clear that said screens serve only as intermediate imaging elements and do not form the final record. The final image is made or reproduced on a separate recording medium or display. Said radiographic screens can be used repeatedly. Before re-use of radiographic screens containing a photostimulable phosphor the residual energy pattern is erased by flooding with light. The expected life of the phosphor screen is limited mainly by mechanical damage such as scratches.

Common radiographic screens comprise in order: (1) a support (also called substrate), (2) a binder layer comprising phosphor particles, usually having a particle size in the range of 1 to 40 μm, applied from an organic solvent or solvent mixture comprising the binder in dissolved and the phosphor particles in dispersed form, and (3) a protective coating to protect the phosphor-containing layer against moisture and abrasion during use. Further, a primer layer is sometimes provided between the phosphor containing layer and the substrate to closely bond said layer thereto.

A radiographic screen whether it is photostimulable or not is generally prepared as follows:

phosphor particles are mixed with a dissolved organic polymeric binder in a suitable mixing ratio to prepare a dispersion. Said dispersion is uniformly applied to a substrate by a known coating technique, e.g. doctor blade coating, roll coating, gravure coating or wire bar coating, and dried to form a luminescent phosphor-binder layer. The phosphor-to-binder weight ratio is usually in the range of 80:20 to 95:5.

The coating of said phosphor binder layer comprising a large amount of organic solvent poses a serious problem of solvent recovery because organic solvents may not enter the environment.

The protective layer will almost be indispensable where the screens have to be handled in combination with radiographic films or are subjected to roller transport.

In modern hospitals, where a large number of X-ray eposures are made on a daily basis, automatic film changer devices are used wherein each lightsensitive film is fed into a cassette in contact with a pair of X-ray conversion screens. The feed path of the film changes abruptly near the entrance of the cassette and on entering the cassette the rim of the film touches the screens with sufficient mechanical force to cause damage to the phosphor layer if it were not protected by an abrasion resistant topcoat.

In particular radiographic recording embodiments applied e.g. in radiography operating with photostimulable storage phosphor screens the radiographic screens are handled without protective cassette and transported in the various process stations between rollers whereby the screens are subjected to considerable friction forces which may result in abrasion.

These features make that practically binderless phosphor-containing screens have never been considered for use in embodiments of radiography wherein the screens are subjected to friction, e.g. by contact with film or transport means.

The failure of the abrasion resistance of the phosphor-containing screen may result in defects such as scratches, cracks and dust formation whereby correct medical diagnosis becomes impossible and screen defects in industrial radiography can be interpreted as material failures of the non-destructively tested object.

Especially in medical radiography there is a demand to reduce the dose of X-ray radiation received by the patient without affecting the quality of the radiograph for diagnostic purposes. A main feature in reducing the X-ray dose is to dispose of a radiographic screen with high X-ray stopping power and high conversion of X-ray energy into fluorescent light. The X-ray stopping power depends largely on the kind of phosphor but also on its packing density in the screen, and the image sharpness which is a primary feature in correct diagnosis depends largely on the phosphor layer structure.

Blurring from lateral diffusion of light in the phosphor-containing layer is decreased as (1) the phosphor layer is made thinner, (2) fluorescent light absorbing dyes or pigments are present therein or coated as anti-halation layer, and (3) the size of the phosphor particles is decreased to increase internal scattering which will result in increased internal light absorption particularly when screening dyes or pigments are present (ref. The Fundamentals of Radiography, 12th. ed. Health Sciences Markets Division—Eastman Kodak Company Rochester, New York 14650, p. 58–59).

However, the packing density of the phosphor particles cannot be increased unrestrained since the presence of a binder is a conditio sine qua non for obtaining a sufficient coherence between the phosphor particles and adherence to their support in view of a necessary resistance to abrasion in handling or machine transport of the screens.

Taking into account the preceding in order to obtain radiographic screens with an X-ray absorption power and fluorescent light emission power as high as possible combined with a sufficient mechanical strength the binder content has to be kept at a minimum but has to be still high enough to fulfil the requirement for sufficient mechanical strength.

Binder-free phosphor layers, e.g. applied by vapour-deposition, are in practice solely reserved in the production of cathode ray tubes and X-ray image intensifier tubes (ref. the periodical Medicamundi, 19, No. 1, (1974) p. 3–7, wherein the phosphor layers cannot suffer from damage by mechanical wear. Moreover, as can be learned from the last mentioned periodical not every phosphor is suited for vapour deposition, and the obtained speed is generally too low for medical purposes since the phosphor grain size obtained by that coating method is particularly small.

According to another technique luminescent material is deposited binder-free by electrophoretic deposition from a mainly organic liquid forming phosphor layers for use in displays and CRT tubes as described e.g. in U.S. Pat. Nos. 2,851,408, 3,681,222 and J. Electrochem. Soc., Vol. 136, No. 9, September 1989, p. 2724–2727.

Phosphor particles suited for use in the production of radiographic screens as mentioned already must have sufficient X-ray stopping power and contain therefor heavy weight atomic elements (atomic number $Z>50$) whereby these particles have a particularly high density, and are not easily dispersed in organic liquids.

A further problem is to deposit these phosphor particles to their support with sufficient adherence thereto and sufficient coherence to allow further coating with a protective layer as referred hereinbefore without damaging the phosphor particle layer.

SUMMARY OF THE INVENTION

It is an object of the present invention to provide a radiographic system comprising the use of radiographic screens containing a phosphor particle layer of high packing density with poor binder content but still good resistance to abrasion offering high fluorescent light output and images of particularly good sharpness.

It is a further object of the present invention to provide a method for the production of a radiographic screen comprising a phosphor particle-containing layer with particularly high phosphor packing density and wherein said layer after its coating has not to be freed from large amounts of organic solvents that have to be recovered principally for ecological reasons.

It is another object of the present invention to provide a method for the production of a radiographic screen as defined above wherein the deposition of said phosphor particles proceeds in such a way that a coherent phosphor layer of poor binder content is produced with good adherence to its support.

It is a further object of the present invention to provide a method for the production of a radiographic screen as defined above wherein the poor binder content phosphor-containing layer can be overcoated or laminated with a protective layer without damaging said phosphor layer.

The above objects are accomplished by applying in the production of a radiographic screen containing a phosphor layer on a support the following steps:

1) dispersing phosphor particles in an organic liquid in the presence of a charge controlling agent that charges said phosphor particles with a positive or negative net charge, wherein the dispersing of said phosphor particles proceeds by means of an organic surface active compound acting as dispersing agent for said phosphor particles, and said phosphor particles are electrostatically charged through adsorption thereon of ionic components of said organic surface active compound and/or through adsorption of cations or anions stemming from an ionic inorganic compound incorporated in said liquid, 2) arranging said dispersion between a pair of electrodes, wherein one of said electrodes is or carries a conductive support of said radiographic screen, 3) applying and maintaining between said electrodes a sufficiently high direct current voltage to deposit charged phosphor particles onto said conductive support, and 4) separating said support carrying electrophoretically deposited phosphor particles from said organic liquid.

According to an embodiment for forming a phosphor layer with poor binder content in said method the charged phosphor particles are electrophoretically deposited in the presence of dispersed and/or dissolved resin binder or in situ binder-forming substance(s) improving the coherence of the deposited phosphor particle layer and its adherence to said conductive support after evaporation of said organic liquid.

Still further in accordance with the present invention said method comprises the additional step of applying onto the electrophoretically deposited phosphor layer an organic polymeric coating protecting said phosphor layer against damage.

The present invention is further directed to the use in radiography of a radiographic screen wherein in a supported phosphor-containing layer electrophoretically deposited phosphor particles are present in conjunction with a resin binder and the volume ratio of phosphor-to-resin binder is in the range from 80/20 to 99.9/0.1, preferably from 90/10 to 99.9/0.1, and the density of the phosphor is at least 5 g/cm$^3$.

BRIEF DESCRIPTION OF THE DRAWING

The FIGURE is a perspective view, partly in cross-section and partly in phantom lines, of an electrophoretic deposition apparatus useful in carrying out the electrophoretic deposition of the present invention.

DETAILED DESCRIPTION OF THE INVENTION

In the present invention by "radiography" is understood (1) a process wherein a phosphor layer is struck by pattern-wise modulated penetrating radiation, e.g. X-rays, producing thereby on prompt emission a fluorescent light pattern which is detected photographically, e.g. by means of a photographic silver halide emulsion layer material, or is understood (2) a process wherein pattern-wise modulated penetrating radiation, e.g. X-rays, is absorbed in a phosphor layer struck by said pentrating radiation, and energy stemming from said penetrating radiation stored in said phosphor layer is released in the form of a fluorescent light pattern by thermo- or photostimulation, and said fluorescent light pattern is detected, e.g. photo-electronically whereby the fluorescent light is converted into electrical signals.

Electrophoresis is a process wherein electrostatically charged particles are moved through a dispersing medium under the influence of a direct current (DC) electric field applied between a pair of electrodes. According to the polarity of the net charge acquired by the dispersed particles, said particles will move to the cathode or anode.

As shown by the following equation (1):

$$\mu = A\zeta\epsilon/\eta$$

the electrophoretic mobility ($\mu$) of a suspended particle is directly proportional to the product of the zeta-potential ($\zeta$) and the dielectric constant ($\epsilon$) of the liquid, and inversely proportional to the viscosity ($\eta$) of said liquid; A is the constant $1/6\pi$ following Smoluchowski's theory.

The zeta-potential ($\zeta$) is related to the charge (Q) of the particle by the following equation (2):

$$\zeta = Q/\epsilon r \left( \frac{1}{1 + \kappa r} \right)$$

wherein: r is the radius of the particle, $1/\kappa$ is the Debye length and $\epsilon$ is the dielectric constant. The Debye length is usually taken as a measure of the thickness of the double layer (ref. the book "Electrophotography" by R. M. Schaffert—The Focal Press—London and New York (1975) p. 562–563). From said equation can be learned that the net charge (Q) on a dispersed (suspended) phosphor particle is directly proportional to the zeta-potential.

In order to dispose of phosphor dispersions having a not too slow electrophoretic deposition speed the zeta-potential of the phosphor particles should preferably be in the range from 15 to 150 mV.

The zeta-potential can be calculated starting from the measured electrophoretic mobility of the dispersed particles. Such measurement proceds e.g. by means of a PEN-KEM System 3000 apparatus (marketed by PEN-KEM Inc, 341 Adams Street—Bedford Hills N.Y. 10507 USA).

The measurement of the electrophoretic mobility of the dispersed phosphor particles in the presence of a charge controlling agent is carried out under the following conditions:

500 mg of the phosphor particles to be electrodeposited are dispersed by ultrasonic treatment in a first test in 100 ml of the dispersing liquid without charge controlling agent and in a second test in said liquid containing in an appropriate amount the charge controlling agent to be tested. In both test dispersions the electrophoretic mobility of the dispersed phosphor particles is measured using palladium electrodes having inbetween a potential gradient of 20 V/cm. The zeta-potential is calculated using the above defined equation (1).

The volume resistivity of a polar organic liquid dispersing medium for use according to the present invention is preferably at least $10^5$ Ohm.cm, and the dielectric constant is preferably lower than 40 at 20° C.

The viscosity of a preferred dispersing liquid should be low, e.g. not higher than 10 m. Pa.s at 20° C.

Examples of organic polar solvents useful in serving as dispersing liquid for inorganic phosphor particles to be deposited by electrophoresis for producing radiographic screens according to the present invention are: 1-propanol, 2-propanol (isopropanol), 1-butanol, 2-methyl-1-propanol, 2-butanol, dimethyl ketone (acetone), methyl ethyl ketone (butanone-2), and lower alkyl esters, e.g. ethyl acetate and mixtures thereof.

Examples of organic non-polar solvents that may serve as dispersing liquid for inorganic phosphor particles to be deposited by electrophoresis for producing radiographic screens according to the present invention are non-polar liquids having a volume resistivity of at least $10^9$ ohm-cm and a dielectric constant not higher than 3. Such liquids are applied in the electrophoretic development of electrostatic charge images obtained through an electrophotographic process known in the art. Examples of such liquids are aliphatic hydrocarbons such as hexane, cyclohexane, iso-octane, heptane or isododecane, a fluorocarbon or a silicone oil or an aromatic hydrocarbon such as xylene containing minor amounts of lower alcohols, e.g. 3 to 4% of methanol as described in the above mentioned book of R. M. Schaffert, p. 566 and in U.S. Pat. No. 4,525,446.

The surface active compounds or agents used in the dispersing of the phosphor particles capable of converting X-rays into fluorescent light possess a hydrophilic and hydrophobic molecule part whereby the surface active molecules are adsorbed to the inorganic phosphor particles through their hydrophilic part and the hydrophobic part extends in the organic liquid phase (ref. Industrial and Engineering Chemistry, Vol 56, No. 9, September 1964, p. 26–31).

Surface active agents useful as dispersing agents can be anionic, cationic, nonionic or amphoteric as described e.g. in McCutcheon's Detergents & Emulsifiers 1978 North American Edition—McCutcheon Division, MC Publishing Co. 175 Rock Road, Glen Rock, N.J. 07452 USA, and in Tensid-Taschenbuch Herausgegeben von Dr. Helmut Stache, Carl Hanser Verlag München Wien 1979.

Dispersing agents of the ionic type are capable of producing specific ions (either cations or anions) that can adsorb to the phosphor particle surface and give it a particular net surface charge whereby these dispersing agents act as charge controlling agents.

Examples of organic dispersing agents simultaneously acting as charge controlling agents are charge controlling dispersing agents known from electrophoretic development in electrophotography, e.g. Cu-oleate, dioctylsulfo-succinate (sold under the tradename AEROSOL OT by American Cyanamid and Chemical Corporation) described in the above mentioned book of R. M. Schaffert, p. 566. Further are mentioned metal alkyl sulphonates described in U.S. Pat. No. 4,138,351, tri-iso-amyl-ammonium picrate and onium salt polymers described in U.S. Pat. No. 4,525,446 giving a net positive charge to dispersed toner particles.

Non-ionic surface active organic compounds, e.g. glycerol monolaurate, that are capable of dispersing phosphor particles in liquid organic polar medium have to be used in combination with (a) charge controlling compound(s) for enabling the electrophoretic deposition of the phosphor particles.

Preferred organic surface active compounds for use according to the present invention for dispersing inorganic phosphor particles are these which provide to the phosphor particles the possibility to deposit on a cathode (negatively charged electrode) in polar organic liquids. Examples of such organic surface active compounds are: alkyl aryl polyether sulphates, organic phosphates, phosphate esters, e.g. the phosphate esters used as dispersing agents for photoconductive zinc oxide described in U.S. Pat. No. 3,245,786, and phospholipids, e.g. lecithine.

The dispersing agent(s) is (are) present normally in a weight percentage of 0.1 to 5 with respect to the weight of the phosphor particles, but may be varied according to the type of phosphor particles, their surface area, the dispersing liquid and the desired net charge.

Particularly preferred dispersants for use in polar organic liquids such as methyl ethyl ketone are organic phosphoric acid mono- and diesters represented by the following structural formulae:

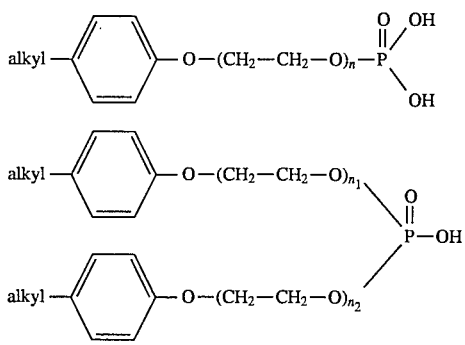

wherein: alkyl is a C15 to C20 alkyl group, n represents 15 to 20, and $n_1$ and $n_2$ together represent 15 to 20.

A mixture of these phosphoric acid esters is sold under the tradename GAFAC RM-710 by ANTARA General Aniline (ref. Chem. & Eng. News 40 (1962) No. 16 p. 87).

According to a particular embodiment for improving the charging action of the charge controlling agents a minor amount of water is present in the organic dispersing liquid, e.g. up to 3 %wt, not increasing the conductivity to break down level.

Particularly when minor amounts of water are present charge control of the phosphor particles can be obtained with inorganic salts in small concentrations.

Suitable inorganic charge controlling agents for use in polar organic liquid medium, e.g. in combination with nonionic dispersing agents, are inorganic metal or onium (e.g. ammonium) salts, e.g. magnesium, calcium, barium, strontium aluminium, sodium, potassium, lithium nitrates, sulphates, fluorides, chlorides or bromides.

It is general knowledge that sharper images with less noise are obtained with phosphor particles of smaller mean particle size, but light emission efficiency declines with decreasing particle size. Thus, the optimum mean particle size for a given application is a compromise between imaging speed and image sharpness.

The mean particle size of phosphor particles for use in the manufacture of radiographic screens according to the present invention by electrophoretic deposition may vary from 1 μm to 40 μm. A preferred range is from 2 to 20 μm with 50% or more of the particles ranging in size from 4 to 10 μm.

For the production of a conventional X-ray intensifying screen the phosphor used is an inorganic fluorescent substance that has a good prompt emission of ultraviolet radiation and/or of visible light when struck by penetrating X-ray radiation and has low after-glow.

Hereinafter a non-limitative survey is given of "prompt emission" phosphors that can be used in the production of radiographic screens according to the present invention.

calcium tungstate, zinc sulfide, zinc cadmium sulfide, zinc oxide and calcium silicate, zinc phosphate, alkali halides, cadmium sulfide, cadmium selenide, cadmium tungstate, magnesium fluoride, zinc fluoride, strontium sulfide, zinc sulfate, barium lead sulfate, barium fluorohalides, and mixtures of two or more of the above. The above phosphors may be activated with, for example, europium, silver, copper, nickel. Phosphors which are particularly suitable for use in high speed X-ray conversion screens are those selected from fluorescent substances containing elements with atomic number 39 or 57 to 71, which include rare earth elements such as yttrium, gadolinium, lanthanum and cerium. Particularly suitable are the rare earth oxysulfide and oxyhalide fluorescing materials activated with other selected rare earths e.g. lanthanum and gadolinium oxybromide and oxychloride activated with terbium, ytterbium or dysprosium, lanthanum and gadolinium oxysulfide activated with terbium, europium, or a mixture of europium and samarium, yttrium oxide activated with gadolinium, europium, terbium or thulium, yttrium oxysulfide activated with terbium or a mixture of terbium and dysprosium, yttrium tantalate doped with small amounts of terbium or strontium or lithium or a mixture thereof and activated with thulium, niobium, europium, gadolinium, neodymium. These and other rare earth fluorescent materials have been extensively described in the literature for which we refer, e.g., to EP 11909, EP 202875, EP 257138, DE 1282819, DE 1952812, DE 2161958, DE 2329396, DE 2404422, FR 1580544, FR 2021397, FR 2021398, FR 2021399, UK 1206198, UK 1247602, UK 1248968, U.S. Pat. Nos. 3,546,128, 3,725,704, 4,220,551, 4,225,653, also to K. A. Wickersheim et al. "Rare Earth Oxysulfide X-ray Phosphors", in the proceedings of the IEEE Nuclear Science Symposium, San Francisco, Oct. 29–31, 1969, to S. P. Wang et al., IEEE Transactions on Nuclear Science, February 1970, p. 49–56, and to R. A. Buchanan, IEEE Transactions on Nuclear Science, February 1972, p. 81–83. A survey of blue light and green light emitting phosphors is given in EP 88820.

A monoclinic M' structure yttrium or yttrium/gadolinium strontium tantalate or niobate phosphor or tantalate-niobate phosphor, e.g. a phosphor according to the following empirical formula:

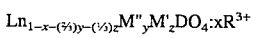

$$Ln_{1-x-(\frac{2}{3})y-(\frac{1}{3})z}M''_yM'_zDO_4:xR^{3+}$$

wherein:

M" is Sr,

M' is Li, optionally present in admixture with Na and/or K,

Ln is Y or a mixture of Y and Gd,

D is at least one element from the group consisting of Ta and Nb,

R is at least one activator selected from the group consisting of Tm, Ce, Pr, Sm, Eu, Tb, Dy and Yb or the base material being self-activating, x is a value in the range $0<x<0.05$, y is a value in the range $1\times10^{-5}<y<1$, and z is a value in the range of $1\times10^{-4}<z<0.1$.

The preparation of said lastmentioned phosphors is described e.g. in published European patent application (EP-A) 0 202 875. The average grain size of said phosphors is preferably in the range of 2 to 20 micron.

By using a plurality of electrophoretically deposited phosphor layers of different composition or by forming a phosphor layer comprising a mixture of different phosphors a fluorescence over the whole visible spectrum can be obtained, so that such combination is particularly useful for recording with silver halide recording elements that have been made spectrally sensitive for light of the whole visible spectrum.

A particularly preferred two-layer phosphor combination comprises coating on a support as described hereinafter a first phosphor layer on the basis of $(Y,Sr,Li)TaO_4.Nb$, as disclosed in EP-A-0 202 875, and thereon a second phosphor layer on the basis of $CaWO_4$ or of europium doped BaFCl.

A photostimulable phosphor used in a photostimulable X-ray conversion screen is a phosphor which emits fluorescent light on being irradiated with stimulating excitation light after X-ray irradiation. In practice a stimulable phosphor is prefered which can be stimulated effectively in the wavelength region of 400 to 800 nm and is emitting fluoresent light of wavelength sufficiently differing from the wavelength of the stimulating light.

Hereinafter a non-limitative survey is given of "photostimulable" phosphors that can be used in the production of radiographic screens according to the present invention.

The photostimulable phosphors described in EP 304121, EP 345903, EP 353805, EP 382295, published EP-A 0 209 358, U.S. Pat. Nos. 3,859,527, 4,236,078, 4,239,968, 4,855, 191, 4,508,636, 4,789,785, JP 73/80487, JP 73/80488, JP 73/80489, JP 76/29889, JP 77/30487, JP 78/39277, JP 79/47883, JP 80/12142, JP 80/12143, JP 80/12144=U.S. Pat. No. 4,236,078, JP 80/12145, JP 80/84389, JP 80/160078, JP 81/116777, JP 82/23673, JP 82/23675, JP 82/148285, JP 83/69281 and in JP 84/56479.

The present invention method is particularly interesting for the manufacture of radiographic screens of high phosphor packing density containing electrophoretically deposited phosphor particles selected from the group consisting of $CaWO_4$, $Gd_2O_2S$:Tb and/or $Y_2O_2S$:Tb, LaOBr:Tb, $BaSO_4$:Sr,Eu, BaFCl:Eu, BaFBr:Eu, Yttrium(niobium)tantalates, e.g. $YNb_{1-x}Ta_xO_4$, wherein x is 0.02 to 0.05, (Y,Sr)TaO$_4$/Nb and $Ba_5SiO_4Br_6$:Eu$^{2+}$.

Barium fluorohalides doped with europium obtain diminishing light-output by contact with moisture so that protection against attack by water is desirable. Substances suited for such protection are described e.g. in GB-P 1,575,511, which substances may be added to the dispersing liquid used in electrophoretic deposition of the phosphor particles. Further said phosphor particles may be surrounded by a continuous layer of silica and/or alumina as described e.g. in published PCT-patent application WO 91/10715.

The photostimulable X-ray conversion screen may contain an assemblage of photostimulable phosphor layers containing one or more photostimulable phosphors. The stimulable phosphors contained in distinct photostimulable phosphor layers may be either identical or different. In the phosphor layers the phosphor particles may be of same or different chemical structure and when different in structure they may be of same or different particle size and/or distribution.

Dispersed colorants may be deposited simultaneously with the phosphor particles or colorants dissolved in the liquid organic dispersing medium may be left on drying the phosphor layer to reduce scattered light and improve image sharpness and resolution. Colorants such as phenolphthalein and other anionic colorants may be electrolytically co-precipitated and bonded to the conductive support playing the role of cathode (ref. the already mentioned periodical J. Electrochem. Soc. November 1970, p. 1458).

Suitable colorants improving image sharpness in X-ray phosphor layers are described e.g. in EP-0 178 592, U.S. Pat. Nos. 3,164,719 and 4,130,428.

According to a preferred embodiment the adherence of the electrophoretically deposited phosphor particles to their conductive substrate and the coherence of the phosphor layer is improved by the use in the organic dispersing liquid, preferably polar organic liquid, of minor amounts of water in the presence of cations producing by reaction at the cathode support a hydroxide precipitate serving as a cement (binder) between the deposited phosphor particles and their support (ref. J. Electrochem. Soc., Vol. 137, No. 1, January 1990, p. 346–348)

Suitable cations for producing such cement are $Mg^{2+}$, $Zn^{2+}$, $Al^{3+}$, $La^{3+}$ and $Zr^{4+}$. The cementing action obtained by said hydoxides can be combined with electrophoretical deposition of colloidal silica or silicates acting as binding agent.

Said cementing action can be improved by a crosslinking reaction between hydroxy (HO—) groups of the metal hydroxide precipate and/or hydrated silica by treating the hydoxide containing phosphor layer, preferably after drying, with a polyepoxide, e.g. 1,4-butanediol diglycidyl ether or triglydidyl-triazolidin-3,5-dione described in DE-OS 2 935 354.

According to a convenient mode for obtaining fixing of the electrophoretically deposited phosphor particles the electrophoretically deposited phosphor particles are bonded together by an organic resin binder by using natural, semi-synthetic or synthetic polymer(s) dissolved or dispersed in said organic liquid which after evaporation from the deposited phosphor layer leaves said polymer(s) covering the phosphor particles and fixing them together and to the support. Preference is given to polymers that are tough but not brittle, e.g. polymethyl methacrylat.

According to another embodiment for fixing the phosphor particles together and adhering them to their support is by means of binder precursors, e.g. addition-polymerizable monomers and/or prepolymers, e.g. a drying oil such as linseed oil, dissolved in the organic dispersing liquid or form substantial part of said liquid and which are polymerized or further polymerized in situ after removing the support carrying electrophoretically deposited phosphor particles from the dispersion. The addition polymerization proceeds advantageously in the presence of a polymerization initiator, e.g. thermolytic or photolytic radical former known in the art. Suitable thermolytic radical formers for use at reaction temperatures in the range of 60° to 180° C. are organic peroxides and azo compounds described e.g. in U.S. Pat. No. 4,975,493. By suitable choice of the monomers and/or prepolymers solutions can be made in polar as well as in non-polar dispersing liquids.

According to another embodiment for fixing the phosphor particles together and adhering them to their support is by forming a crosslinked polymeric structure using cross-linkable polymers dissolved in the dispersing liquid and applying the cross-linking agent to the electrophoretically deposited phosphor layer after terminating the electrophoretic deposition step, such before or after removing the adhering organic dispersing liquid by evaporation.

In an example illustrating said embodiment the phosphor particles are electrophoretically deposited from a dispersing liquid containing a dissolved polymer having groups that can react with a polyisocyanate and becomes crosslinked or cured therewith. For example, the polyisocyanate is applied by spraying from an evaporatable solvent onto the electrophoretically deposited phosphor-containing layer wherefrom the dispersing solvent has been removed leaving crosslinkable polymer in the voids between the phosphor particles.

Suitable polyisocyanates, e.g. 2,4-toluene diisocyanate, and crosslinkable polymers for use in said embodiment, e.g. cellulose ester polymers still containing free hydroxy groups and linear polyesters having terminal hydroxy groups, are described e.g. in GB-P 982,665 and U.S. Pat. No. 4,508,636.

According to a further embodiment for binding electrophoretically deposited phosphor particles (a) reactant(s) capable of forming a crosslinked polymeric structure by reaction with moisture ($H_2O$) or through catalytic action of base or acid is (are) dissolved in the organic dispersing liquid free from water or said catalysts. After terminating the electrophoretic deposition of the phosphor particles and optionally removing the organic dispersing liquid by evaporation, moisture or said catalysts is (are) allowed to come into contact with said reactant(s) left in the voids between the deposited phosphor particles.

In an example illustrating the embodiment of polymer-crosslinking with moisture the dispersing liquid contains a maleic anhydride copolymer and polyoxazolane as described in U.S. Pat. No. 4,975,493 and after removing a substantial part of the dispersing liquid the electrophoretically deposited phosphor layer containing interstitially between the deposited phosphor paricles said maleic anhydride copolymer in admixture with said polyoxazolane is treated with moist air while optionally using heat to accelerate the crosslinking reaction. Catalytic quantities of acidic substances, e.g. p-toluene sulfonic acid may optionally be used to accelerate the reaction.

The thus obtained phosphor layers are durable and highly abrasion resistant without containing high amounts of binder. They are resistant to humidity and to discolouration on aging. They do not need a protective overcoat when a sufficient amount of crosslinked binder envelopes and fixes the phosphor particles.

Examples of support materials whereto the phosphor particles suitable for use in radiography may be applied are e.g. in the form of a sheet, panel or web, with the proviso that the support has at least one electrically conductive surface.

Suitable electrically conductive supports are metal sheets such as sheets made of aluminium or stainless steel.

Electrically insulating supports that can be provided with a conductive topcoat are plastic resin films such as films of cellulose acetate, polyvinyl chloride, polyvinyl acetate, polyacrylonitrile, polystyrene, polyester, e.g. polyethylene terephthalate, polyamide, polyimide, cellulose triacetate and polycarbonate and paper coated or laminated with said resins.

Suitable conductive coatings are e.g. vacuum deposited aluminium or transparent indium-tinoxide (ITO) coatings, carbon black dispersion coatings containing carbon black dispersed e.g. in a hydrophilic colloid binder such as hardened gelatin, or are conductive organic polymer coatings. A survey of conductive polymers is given by D. J. Walton under the title: "Electrically Conductive Polymers" in Materials & Design, Vol. 11 No. 3 June 1990, p. 142–152.

In a preferred embodiment the radiographic speed of the phosphor screen is increased by using a support containing or coated with a substance reflecting the emitted fluorescent light of the phosphor. Preferred are white light and to some extent ultra-violet light reflecting pigments such as barium sulphate, lithopone, magnesium oxide, titanium dioxid, (anatas or rutil) or magnesium titanate (the reflexion curves of the lastmentioned three pigments are given in the periodical COATING September 1988, p. 352). The fluorescent light absorbing substances may be applied in the bulk of a resinous support and/or in a binder interlayer, which support or interlayer is overcoated with a transparent conductive layer, e.g. on the basis of vacuum deposited aluminium or conductive tinoxide coating (NESA-coating).

According to particular embodiment fluorescent light reflecting pigments, e.g. as defined above, are deposited electrophoretically prior to the phosphor particles and form a light reflective binderless pigment coating that can obtain coherence strength as described for the phosphor layer.

According to another embodiment a bright silver coated polyester film is used as support containing 3 $g/m^2$ of electrolytically deposited silver as described in Research Disclosure December 1977, item 16435.

For improving image sharpness the conductive support may have a fluorescent light-absorbing character. Such may be obtained with a layer containing carbon black dispersed at high coverage in a fairly conductive binder, e.g. polymer binder known for the production of anti-static layers as described e.g. in U.S. Pat. No. 4,855,191 or with a non-transparent almost black electrically conductive polymer layer (see the above mentioned article of D. J. Walton).

The support may have a thickness between 60 and 1000 micron, more preferably between 80 and 500 micron for easy handling in cassettes or in machine transport between rollers.

The conductive layers may be adhered to insulating resin supports by means of a subbing layer or adhesive layer. Suitable adhesive layers for said purpose are described e.g. in U.S. Pat. No. 5,032,732.

Particularly suitable subbing layers are made on the basis of radiation curable polymers as described e.g. in European patent application 91 201 827.2 relating to a method for the production of a luminescent article containing a supported phosphor-binder layer adhered to its resin support by means of a primer layer. Said method for applying a primer layer comprises the following steps:

(1) coating onto said resin support a layer of a liquid coating composition comprising a liquid monomer or mixture of monomers, wherein at least one of the following resins has been dissolved:
(i) a linear copolyester of isophthalic acid and at least one other dibasic carboxylic acid with an aliphatic diol, said copolyester being soluble in methyl methacrylate for at least 10 g per 100 ml at 20° C.,
(ii) a linear polyester of terephthalic acid and/or isophthalic acid with an oxyalkylated bisphenol, said polyester being soluble in methyl methacrylate for at least 10 g per 100 ml at 20° C., and
(2) radiation-curing said coated layer by addition polymerisation of said monomer(s) using ultra-violet radiation and a photoinitiator or electron beam radiation.

Depending on the electrostatic charge sign of the phosphor particles the electrophoretic deposition is a cataphoretic deposition wherein phosphor particles having a positive net charge move towards a negative electrode support (cathode) or is an anaphoretic deposition wherein phosphor particles having a negative net charge move towards a positive electrode support (anode). In the production of radiographic screens according to the present invention using polar dispersing liquids cataphoretic deposition is preferred since cathode depolarization by the formation of gaseous hydrogen can be easily prevented by the presence of acetone that is transformed by reduction into isopropyl alcohol. Other measures to dislodge gas bubbles from the electrode and to avoid pinholes in the electrophoretically deposited coating are described in published European patent application 0 427 923.

In the electrophoretic deposition of phosphors for producing a radiographic screen according to the present invention the voltage applied between the conductive support and the bias electrode may vary in a wide range according to the volume conductivity of the support or its conductive layer, the volume resistivity and dielectric constant of the phosphor dispersion and the desired phosphor layer thickness obtainable within a certain time. When carrying out the electrophoresis in polar dispersing liquids, e.g. methyl ethyl ketone, the applied potential gradient for uniform and fairly rapid phosphor deposition is preferably in the range of 20 to 100 V/cm.

When carrying out the electrophoresis in non-polar dispersing liquids, e.g. isododecane as dispersing liquid, having a volume resistivity higher than $10^9$ Ohm-cm, substantially higher voltages as in the former case may be applied without electrical breakdown, e.g. a potential gradient of >100 V/cm between the electrodes.

The phosphor dispersions for electrophoretic deposition may have a solids content by weight in the range of 5 to 15%.

The thickness of the electrophoretically deposited phosphor layer may vary between 5 and 500 μm.

According to an embodiment the electrophoretic deposition of said phosphor particles suited for use in radiographic screens or panels proceeds against gravity, i.e. in upward direction whereby the finer phosphor particles are electrodeposited before the coarser ones deposit. Such improves image sharpness.

According to another embodiment in a first electrophoretic deposition stage relatively coarse grain phosphor particles are deposited and in a second stage phosphor particles of much smaller size are deposited to fill up the interspace left by the coarser particles. Operating that way screens with very high packing density are formed which results in improved X-ray stopping power and higher fluorescent light emission.

According to a further embodiment after electrophoretic deposition of the phosphor layer the packing density of the deposited phosphor particles is still further improved by applying pressure to the phosphor-containing layer. When no or only a very small amount of binder is present after the electrophoretic phosphor deposition the phosphor layer will be easily compressed and air removed from the spaces (voids) between the phosphor particles.

Homogeneous electrophoretic deposition proceeds advantageously while moderately stirring the phosphor dispersion or non-turbulently flowing the phosphor dispersion in a gap between a counter-electrode platen and the conductive electrode-support whereon the phosphor particles have to be deposited.

According to a particular embodiment the electrophoretic deposition proceeds in a gap with varying spacing so that the field strength for depositing the phosphor particles is controlled according to a certain pattern or gradient.

A so-called gradient screen can be produced by depositing the phosphor particles in such a way that the phosphor coverage varies gradually (linearly) with the length or width of the screen.

Phosphor screens with pile-like or dot structure can be prepared by applying at least one electrode in dotted structure (an electrode consisting of a plurality of conductive dots) whereto a same or different voltage is applied. Phosphor screens with pile-like structure are described in U.S. Pat. No. 5,055,681.

According to an example the electrophoretic deposition of the phosphor particles proceeds on a conductive support being a 0.5 mm thick sheet of aluminium laminated at one side through an adhesive layer to an electrically insulating polyethylene terephthalate sheet. Said conductive support is immersed vertically in the phosphor dispersion. In front of said conductive support, e.g. at a distance of 2 to 4 cm a stainless steel electrode platen of opposite polarity is arranged. The applied apparatus is represented in the accompanying FIGURE. The illustrated electrophoretic deposition apparatus comprises a cylindrical deposition compartment 1 connected with top and bottom passageways 2 and 3 to an other cylindrical compartment 4 provided with a stirrer 5 which is composed of a vertically arranged shaft 6 provided with a plurality of paddles 7. These paddles circulate the phosphor dispersion in upward direction through the deposition compartment 1 and downward again into the circulation compartment 4. Contained within the deposition compartment 1 is an anode plate 8 made of nickel and the above defined conductive support representing the cathode sheet 9. The electrodes are provided with connection means 10 and 11 for connecting the electrodes to a direct current source (not shown in the drawing) having the required voltage for producing electrophoretic deposition of the phosphor particles onto the cathode support 9. The connection means 11 is riveted to an openable and closable clamp 13 holding the aluminium sheet in vertical position during the electrodeposition of the phosphor particles 14 from the dispersing liquid 15.

According to another example the electrophoretic deposition of the phosphor particles proceeds on sheets of the above defined conductive support that are clamped in a conductive window frame or are held by vacuum suction on a framed porous plate and are immersed horizontally in the phosphor dispersion having at the bottom of an electrophoretic cell (cylindrical vessel) a rotating perforated stainless steel counter-electrode platen or a wire-grid counter-electrode with moderately stirring magnetic stirrer underneath.

After electrophoretic deposition the phosphor coated sheets or panels are taken out of the electrophoretic bath and the adhering solvent is removed by evaporation. The solvent is recovered e.g. by introducing the solvent vapour into a cooler or absorption column.

The scratch resistance of the electrophoretically deposited phosphor layers is improved by applying thereto a protective topcoat.

The protective topcoat is applied e.g. by laminating onto the phosphor-containing layer a thin, clear, transparent, tough, flexible dimensionally stable resin film, e.g. polyamide film as described e.g. in published EP-A 0 392 474.

A topcoat can be applied likewise from a solution in an organic solvent of a film-forming resinous binder filling the voids between the phosphor particles and covering the phosphor particles with a smooth and abrasion resistant coating of resin after evaporation of the solvent.

Preferably the protective coating is applied from a radiation (electron beam or ultraviolet light) curable liquid composition wherefrom no solvent has to be removed by evaporation. For example, the protective layer is formed from a UV curable composition comprising (a) monomer(s) and/or (a) prepolymer(s) that are polymerized by free-radical polymerization with the aid of a photoinitiator. The applied monomer or mixture of monomers is preferably a solvent for the prepolymers used. Examples of particularly suited radiation-curable compositions for forming abrasion resistant topcoats are given e.g. in EP 209 358, JP 86/176900, U.S. Pat. No. 4,893,021 and in European patent application No. 912010097.

The application of the liquid topcoat composition, in order to avoid frictional contact of the electrophoretically deposited phosphor layer with coating means such as rollers, proceeds preferably by dip coating or meniscus coating but may proceed likewise by spraying or by coating monomolecular layers by Langmuir-Blodgett technique as described e.g. in "Physical Chemistry of Surfaces" by Arthur W. Adamson, 5th ed., A Wiley-Interscience Publication—John Wiley & Sons, Inc. New York, (1990) p. 181–185, and by A. Barraud, C. Rosilio, A. Ruaudel-Teixier—Thin Solid Films—68 (1980) p.91–98, under the heading "Polymerized Monomolecular Layers: A new class of Ultrathin Resins for Microlithography".

According to the Langmuir-Blodgett technique monomolecular films can be deposited that tenaceously held and itself may serve as subbing layer for a further applied hydrophobic protective resin topcoat.

A radiographic screen prepared according to the present invention is preferably edge-reinforced by coating the edge faces of said screen with organic polymeric film forming material. Edge-reinforcement of radiographic screens is described e.g. in U.S. Pat. No. 4,510,388 and in European patent application No. 0 158 959.

The radiographic screens produced according to the present invention are useful for application in medical radiography, industrial radiography (non-destructive testing NDT), and autoradiography. In autoradiography a photographic record is formed through the intermediary of penetrating radiation emitted by radioactive material contained in an object, e.g. microtome-cut for biochemical research.

In radiographic screens used in non-detructive testing (NDT), e.g. of metal objects, where more energetic X-rays and gamma rays are used than in medical X-ray applications the phosphor particles are applied preferably on a conductive support made of a metal having an atomic number in the range of 46 and 83.

Examples of such NDT-screens are described in U.S. Pat. No. 3,872,309 and 3,389,255.

In the method for the production of radiographic NDT-screens according to the present invention the phosphor particles are electrophoretically deposited on metal layer or selsupporting foil mainly consisting of metal having an atomic number in the range of 46 to 83.

Said metal serves as electrode in the electrodeposition and acts as an emitter of photo-electrons and secondary X-rays when struck by highly energetic X-rays or gamma rays. The secondary lower energy X-rays and photo-electrons are absorbed in the adjacent phosphor-containing layer at a higher efficiency than the highly energetic X-rays and gamma rays emitted by an industrial X-ray apparatus, such results in an increase in photographic speed. Said metal layers or supports have the additional advantage of reducing the scattered radiation whereby image-sharpness is improved.

According to a particular embodiment image-sharpness is improved by incorporating in the X-ray intensifying screen between the phosphor-containing layer and the support and/or at the rearside of the support a pigment-containing layer of a non-fluorescent pigment being a metal compound, e.g. salt or oxide, of a heavy metal whose atomic number (Z) is at least 46. A preferred pigment used for that purpose is lead oxide (PbO) applied e.g. electrophoretically at a coverage of 100 to 400 g of lead oxide per m².

The invention is illustrated by the following examples without however restricting it thereto. All parts, percentages and ratios are by weight unless otherwise stated.

EXAMPLE 1

A phosphor dispersion for electrodeposition of a phosphor emitting green light by X-ray irradiation was prepared as follows:

To 10.057 g of $Gd_2O_2S$:Tb (average particle size: 2.15 μm) weighed in a volumetric flask of 100 ml, 0.5 ml of a solution of dispersing agent GAFAC RM 710 (tradename) in butanone-2 (1.051 g of dispersing agent in 100 ml of butanone-2) were added to the phosphor mass (0.5% GAFAC RM 710 with respect to the phosphor weight) and the total volume adjusted to 100 ml. Before use as dispersing liquid the technical grade butanone-2 had been made anhydrous by drying on molecular sieves.

The dispersion of the phosphor particles was accomplished by stirring for 1 h with magnetic stirrer.

The thus obtained dispersion was put into a beaker of 250 ml.

Two nickel-sheet electrodes of 16 cm² were inserted in vertical position in said dispersion at an interdistance of 2.5 cm. One of the electrodes forming the cathode plate was by means of conductive tape fixed to a subbed polyethylene terephthalate resin film base having a thickness of 170 μm made at one surface electrically conductive by vapour deposition of an aluminium layer.

The electrodeposition of the phosphor particles was carried out at a DC-voltage difference of 150 V between the electrodes (i.e. at a potential gradient of 60 V/cm).

During the electrodeposition lasting 40 seconds the phosphor-dispersion was stirred with magnetic stirrer.

The electrodeposited phosphor layer had a thickness of 166 μm corresponding with a phosphor-coverage of 66 mg/cm².

EXAMPLE 2

Example 1 was repeated with the difference however, that the deposited phosphor was a (Y,Sr,Li)TaO₄ phosphor and the applied amount of GAFAC RM 710 (tradename) was 0.9% with respect to the phosphor weight.

EXAMPLE 3

Example 1 was repeated with the difference however, that the deposited phosphor was $CaWO_4$ and the applied amount of GAFAC RM 710 was 0.7% with respect to the phosphor weight.

EXAMPLE 4

Example 1 was repeated with the difference however, that the deposited phosphor was a thoroughly dried Ba(Sr)F-Br:$Eu^{2+}$ and the applied amount of GAFAC RM 710 was 1% with respect to the phosphor weight. The phosphor dispersion had been ground for 4 h in a pebble mill before starting the electrodeposition. By eliminating by classical sedimentation the coarser phosphor particles before electrodeposition the smoothness of the deposited phosphor layer was be markedly improved.

EXAMPLE 5

Example 4 was repeated but to the dispersion of the dried Ba(Sr)FBr:$Eu^{2+}$ 0.5% of di(n-butyl)tin-S,S'-bis(β-mercaptopropionate) with respect to the phosphor was added in methyl ethyl ketone to protect the phosphor against the influence of moisture as described in GB-P 1,575,511 and U.S. Pat. No. 4,138,361.

EXAMPLE 6

Example 1 was repeated but to the dispersion containing 10.047 g of $Gd_2O_2S$:Tb and 0.5% of GAFAC RM710 (tradename) with respect to the phosphor, 0.06 g of $Mg(NO_3)_2.6H_2O$ in 10 ml of isopropanol were added. The total dispersion volume was adjusted to 100 ml with methyl ethyl ketone. In the electrophoretic deposition step magnesium hydroxide was formed as cementing agent for the deposited phosphor particles.

EXAMPLE 7

A phosphor dispersion for electrodeposition of a phosphor emitting green light by X-ray irradiation was prepared as follows:

In a glass-lined vessel of 15 l to 1005.7 g of $Gd_2O_2S$:Tb (average particle size: 2.15 μm) 50 ml of a solution of dispersing agent GAFAC RM 710 (tradename) in butanone-2 (1.051 g of dispersing agent in 100 ml of butanone-2) were added to the phosphor mass and the total volume adjusted to 10 l. Before use as dispersing liquid the technical grade butanone-2 had been made anhydrous by drying on molecular sieves.

The dispersion of the phosphor particles was accomplished by stirring for 1 h.

Said dispersion was put into a vessel having the form as illustrated in the accompanying FIGURE. In said dispersion a phosphor screen support was arranged in vertical position in a conductive window frame connected to the negative pole (cathode) of a D.C. voltage source. Said support was a subbed polyethylene terephthalate resin film base having a thickness of 170 μm being made electrically conductive at one side by vapour deposition thereon of an aluminium layer.

A stainless steel electrode (anode) was positioned at a distance of 3 cm of said aluminium coating. A voltage difference corresponding with an electrical field of 60 V/cm was applied to deposit the positively charged phosphor particles on the bare aluminium. After 5 min the voltage source was disconnected and the phosphor coated sheet removed from the dispersion and conveyed horizontally with its phosphor layer in upward position in a drying channel with suction outlet. The phosphor was deposited at a dry coverage of 65 mg/cm².

The thus phosphor-coated sheet material was enveloped at rear and front side with a centrally folded polyamide, Nylon 6,6 film of 8 μm thickness which formed a cover wherein the coated sheet material was inserted. Before applying said cover the polyamide film was precoated at the side to be contacted with said sheet material with CARBOSET (registered tradename) XPD-1246 being an acrylic, solvent soluble, thermosetting adhesive marketed by B. F. Goodrich, Cleveland, Ohio, USA.

The lamination proceeded by introducing gradually the enveloped phosphor-coated sheet between the nip of a pair of rollers of a heated steel roller-laminator, hereby gradually pressing the air out off the voids between the phosphor particles. The applied pressure in the nip of said steel rollers was at least 10 kg/cm while keeping both rollers at a temperature of 80° C. Hereby not only a good bonding of the protective topcoat film to the phosphor layer but also an increase in packing density of the phosphor particles in the electrophoretically binderless electrodeposited ted phosphor layer was obtained.

The thus obtained laminate was edge-reinforced with a UV-curable resin by dipping the edges of the screen in a UV-curable coating on the basis of an acrylated urethane (ref. Research Disclosure December 1977, item 16435 and U.S. Pat. No. 3,719,638), whereupon the coated edges were irradiated with ultraviolet radiation till the adhering coating became solid.

EXAMPLE 8

A phosphor dispersion for electrodeposition of a phosphor emitting green light by X-ray irradiation was prepared as follows:

To 200 g of $Gd_2O_2S$:Tb (average particle size: 2.95 μm), 1 g of a 0.5% solution of dispersing agent GAFAC RM 710 (tradename) and 15 ml of linseed oil in 1000 ml of butanone-2 were added. The total volume was adjusted with butanone-2 to 2000 ml and a homogeneous dispersion was obtained by stirring for 1 h with magnetic stirrer at room temperature. Before use as dispersing liquid the technical grade butanone-2 had been made anhydrous by drying on molecular sieves.

The 2 liter dispersion was put into an electrophoresis cell equipped with stirrer and containing horizontally arranged electrodes.

On the lower electrode being a porous electrode platen (cathode) a polyethylene terephthalate film coated with a vapour-deposited conductive aluminium layer is fixed by suction using a water-aspirator vacuum pump.

The electrodeposition of the phosphor particles was carried out at a a potential gradient of 140 V/cm over an electrode gap of 0.7 cm.

The electrodeposition lasted 10 seconds whereupon the dispersion was removed.

The thus deposited layer was allowed to dry at the air for 3 days. A non-sticky well adhering and cohesive phosphor layer having a thickness of 105 μm and coverage of 48.5 mg/m² was obtained.

We claim:

1. A radiographic screen wherein a supported phosphor-containing layer electrophoretically deposited particles are present in conjunction with a resin binder and the volume ratio of phosphor-to-resin binder is in the range from 80/20 to 99.9/0.1, the density of the phosphor is at least 5 g/m³ and wherein said phosphor particles are present in contact with a surface active compound which is a member selected from the group consisting of an alkyl aryl polyether sulphate, an organic phosphate, a phosphate ester, and a phospholipid.

2. Radiographic screen according to claim 1, wherein said drying oil is linseed oil.

3. Radiographic screen according to claim 1, wherein said organic phosphate ester is an organic phosphoric acid mono- and diester represented by the following structural formulae:

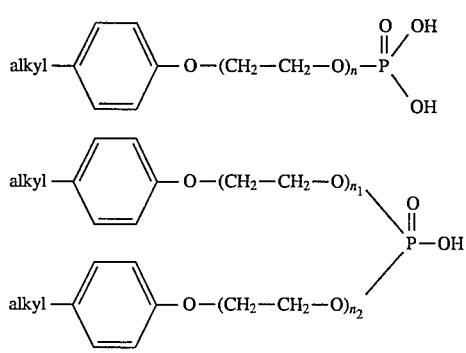

wherein alkyl is a C15 to C20 alkyl group, n is from 15 to 20, and $n_1$ and $n_2$ together are from 15 to 20.

4. Radiographic screen according to claim 1, wherein said phosphor particles are selected from the group consisting of $Gd_2O_2S$: Tb, (Y, Sr, Li)$TaO_4$ and Ba(Sr)FBe: $Eu^{2+}$ phosphor particles.

5. A radiographic screen wherein a supported phosphor-containing layer electrophoretically deposited particles are present in conjunction with a resin binder formed by linseed oil and the volume ratio of phosphor-to-resin binder is in the range from 80/20 to 99.9/0.1, the density of the phosphor is at least 5 g/m$^3$.

* * * * *